United States Patent
Moriarty

(10) Patent No.: US 6,884,161 B2
(45) Date of Patent: Apr. 26, 2005

(54) ROTARY COMBINE HAVING A FRUSTO-CONICAL ROTOR HOUSING

(75) Inventor: Kevin Joseph Moriarty, Davenport, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/211,279

(22) Filed: Aug. 2, 2002

(65) Prior Publication Data

US 2002/0193155 A1 Dec. 19, 2002

Related U.S. Application Data

(62) Division of application No. 09/798,082, filed on Mar. 2, 2001, now Pat. No. 6,468,152.

(51) Int. Cl.$^7$ ................................. A01F 12/18
(52) U.S. Cl. ............................ 460/67; 56/14.6
(58) Field of Search ................ 460/67, 68, 69, 460/73, 74, 84, 85, 87, 88, 89, 113, 121; 56/14.6

(56) References Cited

U.S. PATENT DOCUMENTS

| | | | |
|---|---|---|---|
| 752,182 A | * | 2/1904 | Ross et al. .................. 460/66 |
| 1,776,396 A | * | 9/1930 | Schlayer ...................... 460/69 |
| 1,923,977 A | | 8/1933 | Hewitt |
| 1,949,774 A | | 3/1934 | Baldwin |
| 2,858,019 A | | 10/1958 | Lindahl et al. |
| 3,103,932 A | | 9/1963 | Buchele |
| 3,296,782 A | | 1/1967 | Mark et al. |
| 3,306,302 A | | 2/1967 | Mark et al. |
| 3,376,873 A | | 4/1968 | Herbsthofer |
| 3,410,270 A | * | 11/1968 | Herbsthofer .................. 460/67 |
| 3,426,760 A | | 2/1969 | Mark et al. |
| 3,827,443 A | | 8/1974 | Drayer |
| 4,274,426 A | | 6/1981 | Williams |
| 4,284,086 A | | 8/1981 | Williams |
| 4,353,376 A | | 10/1982 | Schuler |
| 5,445,563 A | * | 8/1995 | Stickler et al. ............... 460/69 |
| 5,688,170 A | * | 11/1997 | Pfeiffer et al. ................ 460/69 |
| 6,257,977 B1 | * | 7/2001 | Moriarty ...................... 460/68 |
| 6,468,152 B2 | * | 10/2002 | Moriarty ...................... 460/67 |

FOREIGN PATENT DOCUMENTS

| | | |
|---|---|---|
| DE | 1 941 248 | 2/1971 |
| DE | 197 22 079 A1 | 12/1998 |
| EP | 0 631 716 A1 | 1/1995 |
| FR | 2 552 301 | 3/1985 |
| FR | 2 653 968 | 5/1991 |
| WO | 97/07660 | 3/1997 |

* cited by examiner

Primary Examiner—Árpád Fabián Kovács

(57) ABSTRACT

A rotary crop processing unit for a combine is shown having a generally cylindrical rotor within a frusto-conical housing. The rotor is arranged in the housing with a generally constant gap between the rotor and the bottom of the housing along the housing length and with an increasing gap between the rotor and the top of the housing in the crop flow direction.

8 Claims, 4 Drawing Sheets

US 6,884,161 B2

ROTARY COMBINE HAVING A FRUSTO-CONICAL ROTOR HOUSING

This application is a division of U.S. patent application Ser. No. 09/798,082 filed Mar. 2, 2001 now U.S. Pat. No. 6,468,152.

FIELD OF THE INVENTION

The present invention is directed to an agricultural combine rotary crop-processing unit having a rotor disposed within a rotor housing and in particular to such a combine in which the rotor housing is frusto-conical while the rotor is generally cylindrical. The housing is arranged relative to the rotor such that the gap between the rotor and the bottom of the housing is generally constant along the length of the housing while the gap between the top of the rotor and the top of the housing gradually increases in the crop flow direction.

BACKGROUND OF THE INVENTION

Rotary combines having a rotary crop-processing unit are well known. Examples are shown in U.S. Pat. Nos. 5,445,563 and 5,688,170 assigned to the assignee of the present application. These two patents both disclose rotary crop processing units having two or more sections. The relationship between the rotor axis and the housing axis varies from one section to the other. In both of these patents, the rotor axis becomes increasingly offset from the housing axis in the crop flow direction from the housing inlet to the housing outlet. This is accomplished by abrupt transitions in the housing structure between sections where the housing shape changes. As the housing shape changes, the housing axis steps upward relative to the rotor axis and the gap between the rotor and the top of the housing increases at each step in the housing.

In a co-pending patent application, also commonly assigned, Ser. No. 378,773, filed Aug. 20, 1999, the rotor and the housing are both generally cylindrical and are arranged such that their axes are nearly concentric at the inlet and diverge in the crop flow direction with the housing axis diverging upward from the rotor axis in the to produce a gradual increase in the gap between the rotor and the top of the housing in the crop flow direction.

SUMMARY OF THE INVENTION

The present invention provides yet another structure for a crop-processing unit to provide an increasing gap between the top of the rotor and the housing in the crop flow direction. The housing of the present invention is frusto-conical in shape when viewed in a vertical section along the housing axis with the housing arranged relative to the rotor such that the top of the housing diverges from the rotor axis in the crop flow direction. This results in the gap between the rotor and the top of the housing gradually increasing in the crop flow direction. The increasing gap between the rotor and the housing enables the crop mat to expand as it passes through the crop-processing unit which aids in separation of the grain from the straw.

The housing radial section can be either circular or oval. With a circular radial section, the housing can also be mounted in the supporting structure of the combine to rotate about the housing axis as well as having the rotor rotate about the rotor axis.

DETAILED DESCRIPTION OF THE INVENTION

Figure 1:
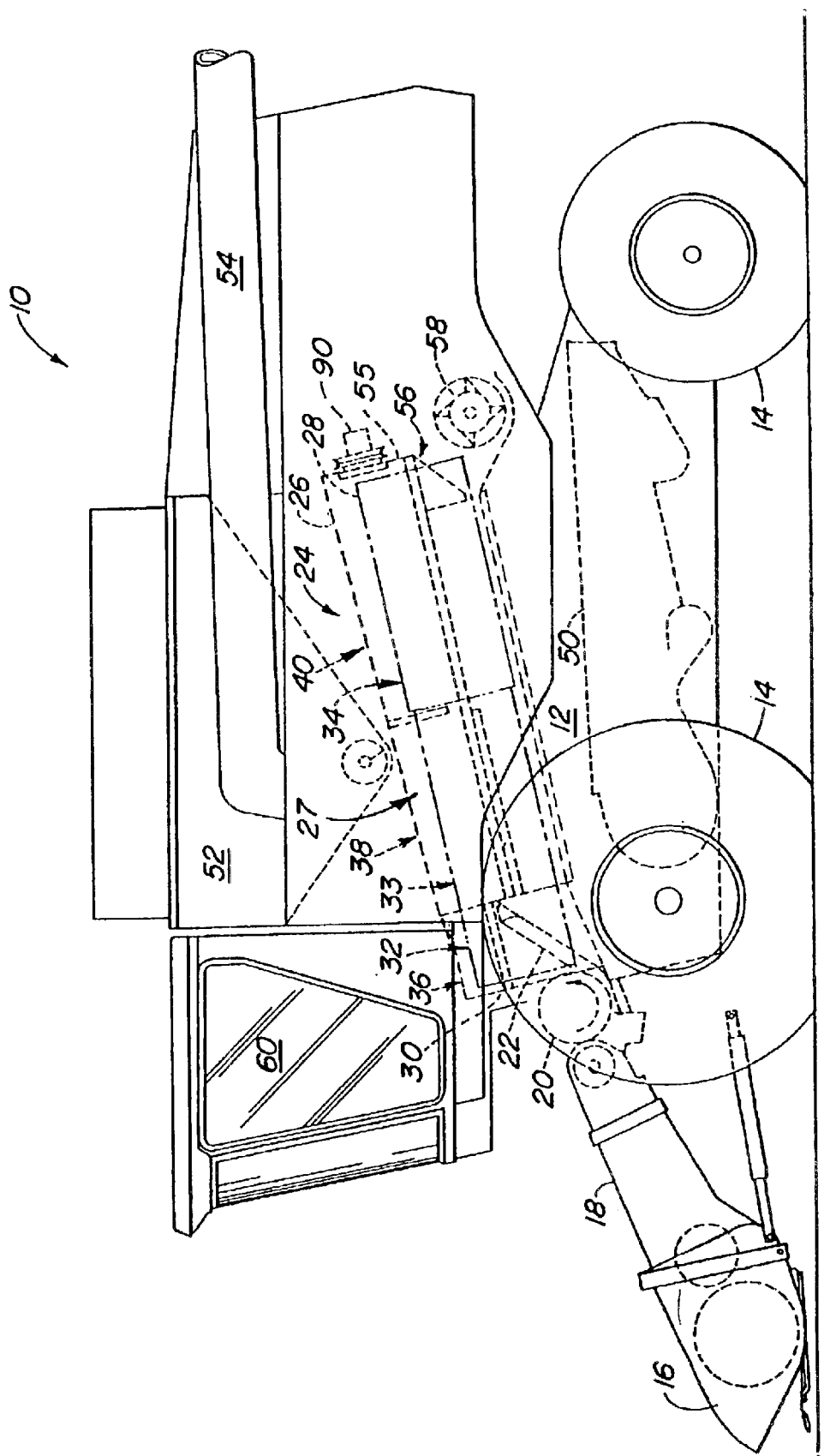
FIG. 1 is a side view of the agricultural combine having the rotary crop-processing unit of the present invention.

FIG. 1 shows an agricultural combine 10 comprising a supporting structure 12 having ground engaging means 14 shown in the form of tires. Alternatively, tracks can be used in place of the tires. A harvesting platform 16 is used for harvesting crop and directing it to a feederhouse 18. The harvested crop is directed by the feederhouse 18 to a beater 20. The beater 20 directs the crop upwardly to a rotary crop-processing unit 24. The rotary crop-processing unit is located between the side sheets of the combine that form part of the supporting structure 12. The rotary crop-processing unit 24 comprises a rotor housing 26 and a rotor 28 located in the housing 26. The harvested crop enters the housing through an inlet 22 at the inlet end 30 of the housing 26 and travels through an annular space 27 between the rotor and the housing. The rotor 28 is provided with an inlet feed portion 32, a threshing portion 33, and a separating portion 34. The rotor housing has a corresponding inlet section 36, a threshing section 38 and separating section 40.

Figure 2:
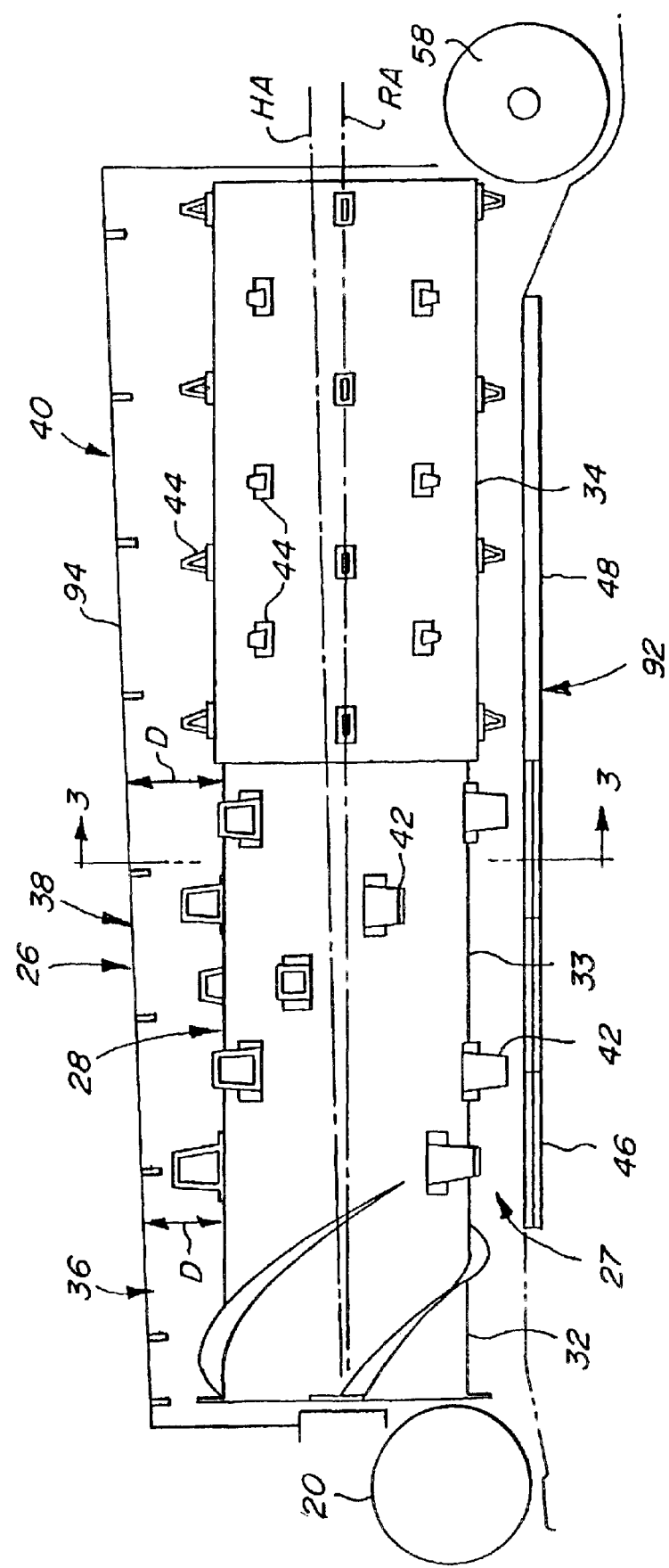
FIG. 2 is a vertical sectional view along the axis of the housing.

Both the threshing portion 33 and the separating portion 34 of the rotor are provided with crop engaging members 42 and 44, respectively, shown in FIG. 2. The threshing section 38 of the housing is provided with a concave 46 while the separating section 40 of the housing is provided with a grate 48. Grain and chaff released from the crop mat falls through the concave 46 and the grate 48. The concave and the grate prevent the passage of crop material larger than grain or chaff from entering the combine cleaning system 50 below the rotary crop-processing unit.

As illustrated in FIG. 1, grain and chaff falling through the concave and grate is directed to the cleaning system 50 that removes the chaff from the grain. The clean grain is then directed by an elevator (not shown) to a clean grain tank 52 where it can be directed to a truck or grain cart by an unloading auger 54. Straw that reaches the outlet end 55 of the housing is expelled through an outlet 56 to a beater 58. The beater 58 propels the straw out the rear of the combine. The crop material moves through the rotary crop-processing unit in a crop flow direction from the inlet end 30 to the outlet end 55 of the housing. The operation of the combine is controlled from the operator's cab 60.

The rotor 28 defines a rotor axis RA about which the rotor is rotated by a rotor drive 90. The rotor axis RA is a straight line passing through the center of all three portions of the rotor. The rotor is generally cylindrical, however, as shown in FIG. 2, the diameter of the rotor is not constant along the entire length of the rotor.

The housing 26 defines a housing axis HA. The housing axis is a straight line passing through all three sections of the housing. The rotor and the housing are arranged relative to one another such that as viewed in a vertical section along the axes of the rotor and housing, the bottom of the rotor and the bottom 92 of the housing are nearly parallel to one another. As a result of the conical shape of the housing, the top 94 of the housing diverges from the generally cylindrical rotor in the crop flow direction. The dimension D between the rotor and the top of the housing gradually increases through each section of the housing in the crop flow direction. Since the different portions of the rotor have different diameters, the dimension D will change abruptly at the beginning of a portion of the rotor where the diameter changes. If desired, the rotor diameter can remain constant through the entire length of the rotor, in which case the dimension D would gradually increase along the entire length of the rotor.

Figure 3:
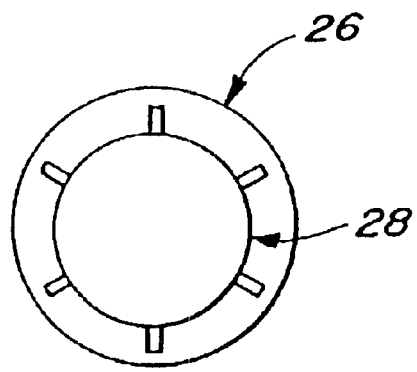
FIG. 3 is a radial sectional view as seen from substantially the line 3—3 of FIG. 2.
Figure 4:
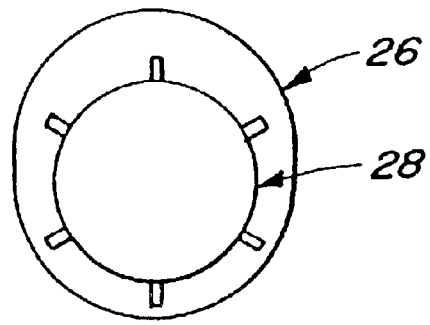
FIG. 4 is a radial sectional view similar to FIG. 3 showing an alternative embodiment.

With reference to FIG. 3, one embodiment of the invention is shown where the housing 26 has a radial section that is circular. At any given radial section, the gap between the rotor and the housing will gradually increase around the circumference of the rotor from the bottom of the rotor to the top. An alternative embodiment is shown in FIG. 4 where the housing is oval shaped in the radial cross-section. The oval shaped housing enables the gap between the rotor and the housing remain constant over the bottom half of the rotor circumference.

Figure 5:
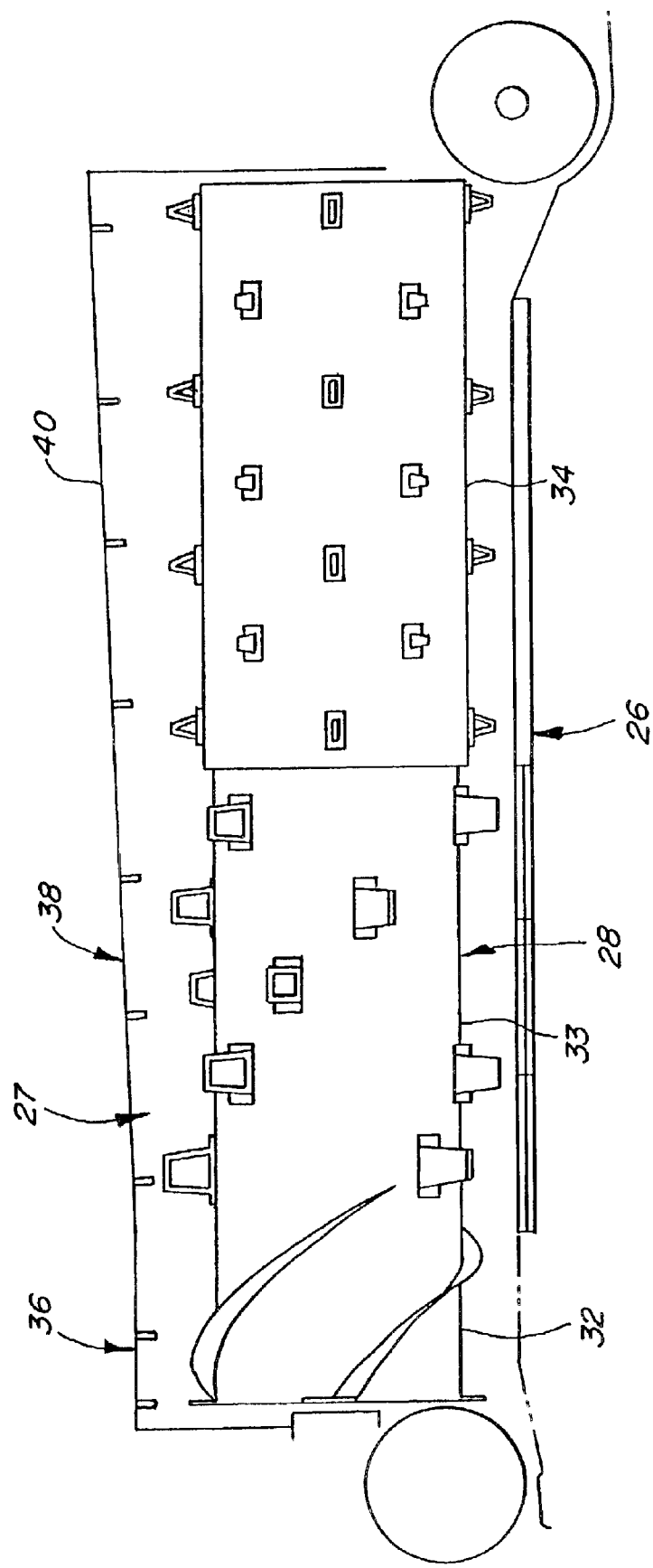
FIG. 5 is a vertical sectional view along the axis of the housing of another embodiment of the invention.

Another embodiment of the invention is shown in FIG. 5. There the housing is cylindrical through the inlet section 36. Only at the beginning of the threshing section 38 does the housing become a frusto-conical. The housing can be arranged with a cylindrical infeed section and frusto-conical threshing and separating sections as shown in FIG. 5 or both the infeed and threshing sections can be cylindrical while the separating section is frusto-conical. Alternatively, the housing can transition from cylindrical to conical at any location along the housing length, not just at a transition between sections.

Figure 6:
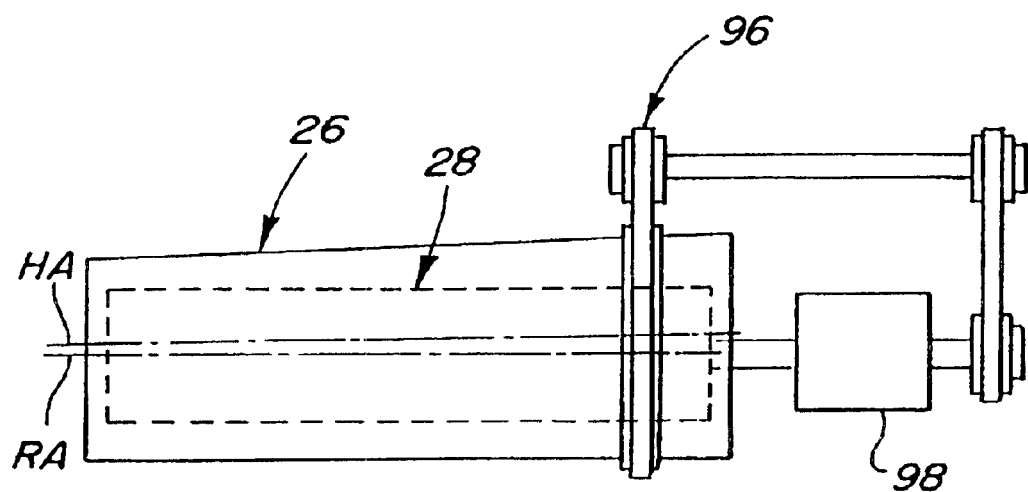
FIG. 6 is schematic side view of a further embodiment of the invention with a rotating housing as well as a rotating rotor.

A further alternative of invention is shown in FIG. 6. There a housing drive 96 is provided for turning the housing 26 about the housing axis HA as well as a drive 98 for rotating the rotor 28. Unlike the crop-processing units shown in the '563 and the '170 patents mentioned above, the frusto-conical housing can be rotated relative to the combine supporting structure as well as the rotor. This design, as shown in U.S. Pat. No. 4,274,426, provides greater flexibility in setting the operating speed of the crop-processing unit.

The frusto-conical housing together with a cylindrical rotor provide a crop processing unit in which the gap between the rotor and the top of the housing can increase in the crop flow direction. The invention should not be limited to the above-described embodiment, but should be limited solely by the claims that follow.

I claim:

1. A threshing and separating mechanism for a combine having a supporting structure, the mechanism comprising:

an elongated rotor mounted in the supporting structure for rotation about a rotor axis, the rotor having a threshing portion and a separating portion;

an elongated housing mounted in the supporting structure for rotation about a housing axis, the housing having a threshing section and a separating section, the housing surrounding the rotor and being spaced from the rotor to form an annular space between the rotor and the housing for crop material to flow through in a crop flow direction from an inlet end of the housing to an outlet end of the housing, the threshing portion of the rotor corresponding to the threshing section of the housing and the separating portion of the rotor corresponding to the separating section of the housing; and the housing having a top that is raised above the rotor to define a gap, the gap between the separating portion of the rotor and the top of the separating section of the housing is greater than the gap between the threshing portion of the rotor and the threshing section of the housing.

2. A threshing and separating mechanism as defined by claim 1 wherein the housing is generally circular in a radial section.

3. A threshing and separating mechanism as defined by claim 2 wherein the rotor is generally cylindrical, the threshing portion of the rotor having a threshing diameter and the separating portion of the rotor having a separating diameter, the threshing and separating diameters being unequal.

4. A threshing and separating mechanism as defined by claim 3 wherein the separating diameter is larger than the threshing diameter.

5. A threshing and separating mechanism as defined by claim 4 wherein the housing, when viewed in a vertical section along the housing axis, is frusto-conical and the gap between the rotor and the top of the housing continuously increases in the crop flow direction from the threshing section to the separating section.

6. A threshing and separating mechanism as defined by claim 5 wherein the housing has in inlet section which is generally cylindrical and located in front of the threshing section in the crop flow direction.

7. A threshing and separating mechanism as defined by claim 1 wherein the housing, when viewed in a vertical section along the housing axis, is frusto-conical and the gap between the rotor and the top of the housing continuously increases in the crop flow direction from the threshing section to the separating section.

8. A threshing and separating mechanism as defined by claim 7 wherein the housing has in inlet section which is generally cylindrical and located in front of the threshing section in the crop flow direction.

* * * * *